(12) United States Patent
Fukayama (10) Patent No.: US 9,081,222 B2
(45) Date of Patent: Jul. 14, 2015

(54) LIQUID CRYSTAL DISPLAY DEVICE

(71) Applicant: JAPAN DISPLAY INC., Tokyo (JP)

(72) Inventor: Norihisa Fukayama, Yokohama (JP)

(73) Assignee: JAPAN DISPLAY INC., Tokyo (JP)

( * ) Notice: Subject to any disclaimer, the term of this patent is extended or adjusted under 35 U.S.C. 154(b) by 42 days.

(21) Appl. No.: 13/851,120

(22) Filed: Mar. 27, 2013

(65) Prior Publication Data

US 2013/0258239 A1   Oct. 3, 2013

(30) Foreign Application Priority Data

Mar. 30, 2012   (JP) ................. 2012-080996

(51) Int. Cl.
*G02F 1/1333*   (2006.01)
*G02F 1/1362*   (2006.01)

(52) U.S. Cl.
CPC .... *G02F 1/133308* (2013.01); *G02F 1/136204* (2013.01); *G02F 2001/13332* (2013.01); *G02F 2001/133317* (2013.01); *G02F 2202/22* (2013.01)

(58) Field of Classification Search
CPC ................................................. G02F 1/133314
USPC .............. 349/60; 361/42, 136, 219, 600, 753, 361/752, 362
See application file for complete search history.

(56) References Cited

U.S. PATENT DOCUMENTS

| 5,627,725 | A  | * | 5/1997  | Yamada et al. ......... 361/679.21 |
| 6,388,722 | B1 | * | 5/2002  | Yoshii et al. ................. 349/62 |
| 6,532,152 | B1 | * | 3/2003  | White et al. .................. 361/692 |
| 7,724,318 | B2 | * | 5/2010  | Saiki et al. ..................... 349/58 |
| 2004/0196413 | A1 | * | 10/2004 | Satonaka ....................... 349/58 |
| 2006/0087804 | A1 | * | 4/2006  | Tsukamoto ................... 361/681 |
| 2006/0158579 | A1 |   | 7/2006  | Hasegawa |
| 2008/0049295 | A1 | * | 2/2008  | Tonar et al. .................. 359/267 |
| 2008/0088768 | A1 |   | 4/2008  | Kohno |

(Continued)

FOREIGN PATENT DOCUMENTS

| DE | 44 12 278  | * 10/1995 |
| JP | 2005-77590 | *  3/2005 |

(Continued)

OTHER PUBLICATIONS

Translated verion of J 2005-77590.*

(Continued)

*Primary Examiner* — Richard Kim
(74) *Attorney, Agent, or Firm* — Lowe Hauptman & Ham, LLP (57) ABSTRACT

A conductive elastic sheet includes: an outer portion sandwiched between a resin frame portion and a metal frame portion and brought into contact with the metal frame portion; an inner portion laminated to an image display screen; and a connecting portion connecting the outer and inner portions. An upper surface of the resin frame portion is arranged at a higher position than the image display screen. The outer portion of the conductive elastic sheet is arranged at a higher position than the inner portion. The inner portion of the conductive elastic sheet is laminated to the image display screen in a flat shape. The conductive elastic sheet has a slit formed between the outer and inner portions and adjacent to the connecting portion. The connecting portion is bent in a height increasing direction from the same height position as the inner portion.

6 Claims, 5 Drawing Sheets

(56) References Cited

U.S. PATENT DOCUMENTS

| | | |
|---|---|---|
| 2009/0033825 A1 | 2/2009 | Fukuyama et al. |
| 2009/0050353 A1* | 2/2009 | Hashimoto .................. 174/254 |
| 2009/0079894 A1* | 3/2009 | Okuda ........................... 349/58 |
| 2009/0126976 A1 | 5/2009 | Iida |
| 2009/0315843 A1* | 12/2009 | Matsuo ........................ 345/173 |
| 2010/0149453 A1 | 6/2010 | Lee et al. |
| 2011/0007485 A1* | 1/2011 | Hirai ............................ 361/753 |
| 2011/0199554 A1* | 8/2011 | Isami et al. .................... 349/58 |
| 2012/0287066 A1* | 11/2012 | Yang et al. ................... 345/173 |

FOREIGN PATENT DOCUMENTS

| | | | |
|---|---|---|---|
| JP | 2008-065213 | * | 3/2008 |
| JP | 2009-036893 | * | 2/2009 |

OTHER PUBLICATIONS

Partial English Translation of the Office Action in Korean Patent Application No. 10-2013-32021, dated Mar. 7, 2014.

* cited by examiner

LIQUID CRYSTAL DISPLAY DEVICE

CROSS-REFERENCE TO RELATED APPLICATION

The present application claims priority from Japanese application JP2012-080996 filed on Mar. 30, 2012, the content of which is hereby incorporated by reference into this application.

BACKGROUND OF THE INVENTION

1. Field of the Invention

The present invention relates to a liquid crystal display device.

2. Description of the Related Art

With respect to a liquid crystal display panel, there has been known the structure where static electricity generated on an image display screen of the liquid crystal display panel can be released by laminating conductive rubber to the image display screen (JP 2005-77590A). An edge portion on a back surface side of a display panel is supported on a resin frame. A metal frame is arranged above a peripheral portion of the image display screen of the liquid crystal display panel. To prevent the liquid crystal display panel from coming into contact with the metal frame when the liquid crystal display panel is warped, a gap is formed between the image display screen and the metal frame. Further, the conductive rubber laminated to the image display screen extends between the resin frame and the metal frame from the image display screen and is electrically connected to the metal frame. Due to such a constitution, static electricity can be released from the metal frame.

The liquid crystal display panel is arranged at a position below the metal frame and hence, the conductive rubber is bent obliquely in an upward direction from the image display screen of the display panel and extends over the resin frame so that an elastic force of the conductive rubber acts so as to peel off the conductive rubber from the image display screen. Accordingly, it has been difficult to secure the electrical connection between the conductive rubber and the image display screen.

It is an object of the present invention to provide a liquid crystal display device where it is possible to secure the electrical connection between conductive rubber which is electrically connected to a metal frame and an image display screen.

SUMMARY OF THE INVENTION (1) According to one aspect of the present invention, there is provided a liquid crystal display device which includes: a liquid crystal display panel which has an image display screen and a back surface on a side opposite to the image display screen; a resin frame which includes a support portion for supporting the liquid crystal display panel at a peripheral portion of the back surface, and a resin frame portion which surrounds the liquid crystal display panel; a metal frame which includes a metal frame portion facing a peripheral portion of the image display screen of the liquid crystal display panel and the resin frame portion; and a conductive elastic sheet which includes: an outer portion which is sandwiched between the resin frame portion and the metal frame portion and is brought into contact with the metal frame portion; an inner portion which is laminated to the image display screen of the liquid crystal display panel; and a connecting portion which connects the outer portion and the inner portion; wherein at least a portion of an upper surface of the resin frame portion is arranged at a higher position than the image display screen, at least a portion of the outer portion of the conductive elastic sheet is arranged at a higher position than the inner portion, the inner portion of the conductive elastic sheet is laminated to the image display screen of the liquid crystal display panel in a flat shape, the conductive elastic sheet has a slit formed between the outer portion and the inner portion and adjacent to the connecting portion, and at least one of the outer portion and the connecting portion of the conductive elastic sheet is bent in a height increasing direction from the same height position as the inner portion. According to the present invention, the conductive elastic sheet has the slit formed between the outer portion and the inner portion and hence, even when at least one of the outer portion and the connecting portion is bent, an action imparted to the inner portion by an elastic force of the conductive elastic sheet is small. Accordingly, the inner portion hardly peels off from the image display screen and hence, it is possible to secure the electrical connection between the conductive elastic sheet which is electrically connected to the metal frame and the image display screen. In the present invention, "height" means the direction that the image display screen faces. The height is increased along with the increase of a distance from the image display screen.

(2) The liquid crystal display device described in (1) may preferably be configured such that the upper surface of the resin frame portion has an opposedly facing region which opposedly faces the outer portion of the conductive elastic sheet, the opposedly facing region is formed at a higher position than the image display screen and parallel to the image display screen, the outer portion of the conductive elastic sheet is arranged in a flat shape, and the connecting portion is bent in the height increasing direction from the same height position as the inner portion.

(3) The liquid crystal display device described in (1) may preferably be configured such that the upper surface of the resin frame portion has an opposedly facing region which opposedly faces the outer portion of the conductive elastic sheet, the opposedly facing region has a parallel region which is formed at the same height as the image display screen and parallel to the image display screen, and an inclined region which is inclined such that a height of the inclined region is increased from the parallel region, the outer portion of the conductive elastic sheet is arranged in a flat shape on the parallel region, is arranged in an inclined manner on the inclined region, and is bent between the parallel region and the inclined region, and the connecting portion is arranged in a flat shape at the same height position as the inner portion, and is connected to a portion of the outer portion on the parallel region.

(4) The liquid crystal display device described in any one of (1) to (3) may preferably be configured such that the image display screen has a rectangular planar shape, and the inner portion of the conductive elastic sheet is laminated to a center portion of a side of the rectangular image display screen.

(5) The liquid crystal display device described in any one of (1) to (4) may preferably be configured such that the outer portion of the conductive elastic sheet is elastically deformed by being compressed between the resin frame portion and the metal frame portion.

(6) The liquid crystal display device described in any one of (1) to (5) may preferably be configured such that the metal frame portion is arranged above the image display screen with a gap formed therebetween.

DETAILED DESCRIPTION OF THE INVENTION

Figure 1:
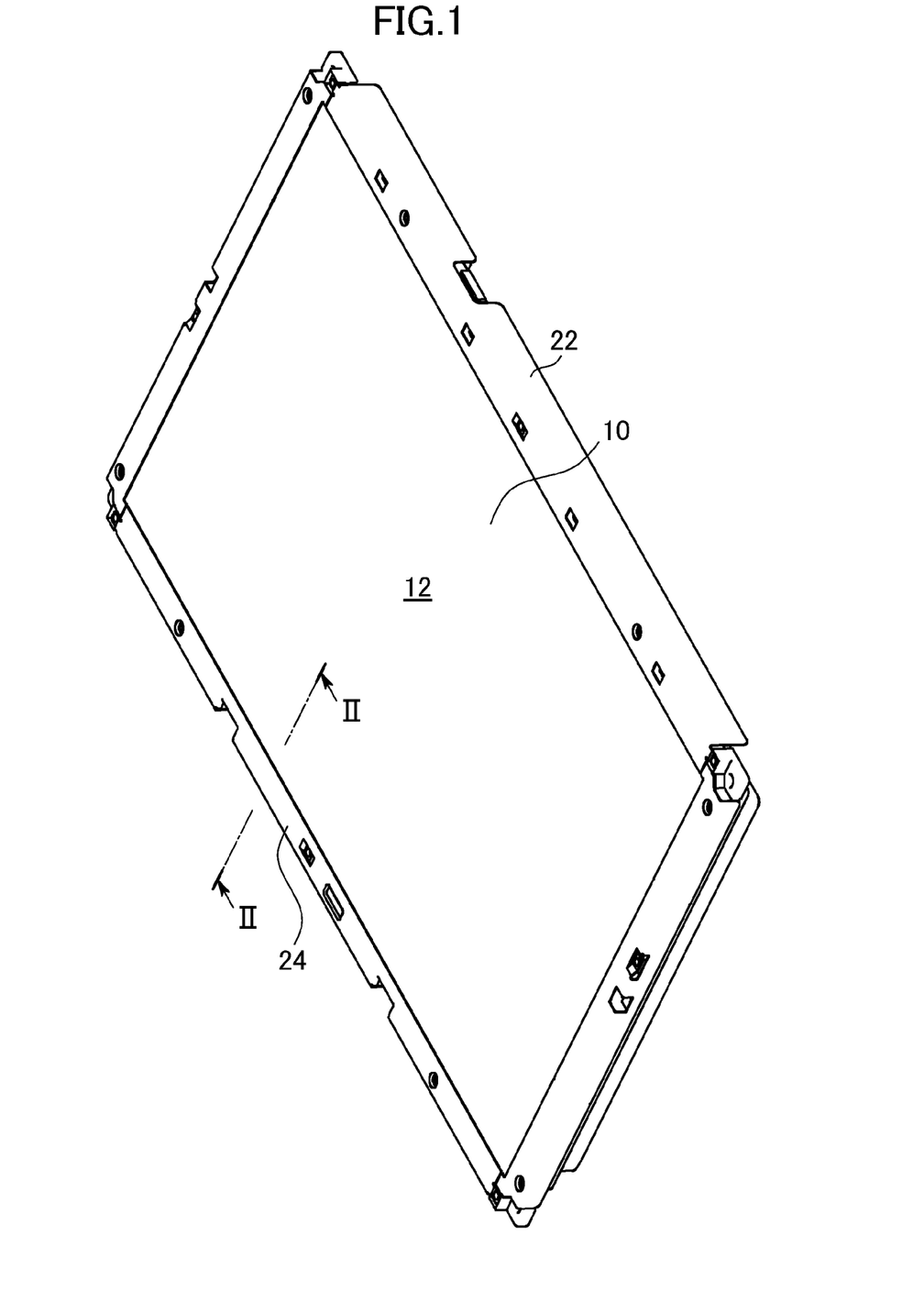
FIG. 1 is a perspective view of a liquid crystal display device according to an embodiment of the present invention.
Figure 2:
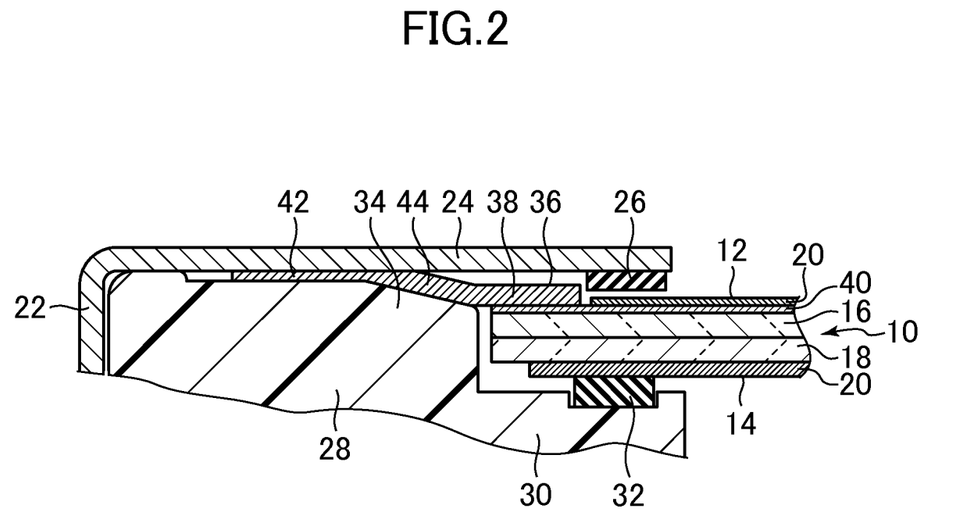
FIG. 2 is an enlarged view of the liquid crystal display device taken along a line II-II in FIG. 1.

Hereinafter, embodiments of the present invention are explained in conjunction with drawings. FIG. 1 is a perspective view of a liquid crystal display device according to the embodiment of the present invention. FIG. 2 is an enlarged view of the liquid crystal display device taken along a line II-II in FIG. 1.

The liquid crystal display device includes a liquid crystal display panel 10. The liquid crystal display panel 10 includes an image display screen 12 arranged on a side where an image is displayed, and a back surface 14 on a side opposite to the image display screen 12. The image display screen 12 has a rectangular planar shape. The liquid crystal display panel 10 includes a pair of substrates 16, 18 (formed of a glass substrate, for example), and a liquid crystal material not shown in the drawing which is arranged between both substrates. A polarizer 20 is arranged on surfaces of the pair of substrates 16, 18 which are opposite to each other. In FIG. 2, the lower substrate 18 is a substrate on which circuits including thin film transistors and the like are formed, and is referred to as a TFT substrate. The upper substrate 16 is a substrate on which color filters, a black matrix and the like not shown in the drawing are formed, and is referred to as a color filter substrate. A driving method of the liquid crystal is a lateral electric field method (for example, an IPS (In Plane Switching) method). The liquid crystal is driven by an electric field generated between pixel electrodes and a common electrode (not shown in the drawing) which are formed on the lower substrate (TFT substrate), and electrodes are not formed on the upper substrate 16 (color filter substrate). The upper substrate 16 does not include a wiring for releasing an electric charge.

The liquid crystal display device includes a metal frame 22. The metal frame 22 includes a metal frame portion 24. The metal frame portion 24 opposedly faces a peripheral portion of the image display screen 12 of the liquid crystal display panel 10. The metal frame portion 24 is arranged above the image display screen 12 with a gap formed therebetween. The gap is formed for allowing the warping of the liquid crystal display panel 10 caused by the expansion and contraction of the polarizer 20 due to heat or an environmental temperature at the time of operation. An elastic body 26 made of rubber, a resin or the like is provided to an opposedly facing surface of the metal frame portion 24 which opposedly faces the image display screen 12 (to be more specific, the polarizer 20). The elastic body 26 absorbs an impact when the metal frame portion 24 is brought into contact with the image display screen 12.

Figure 3:
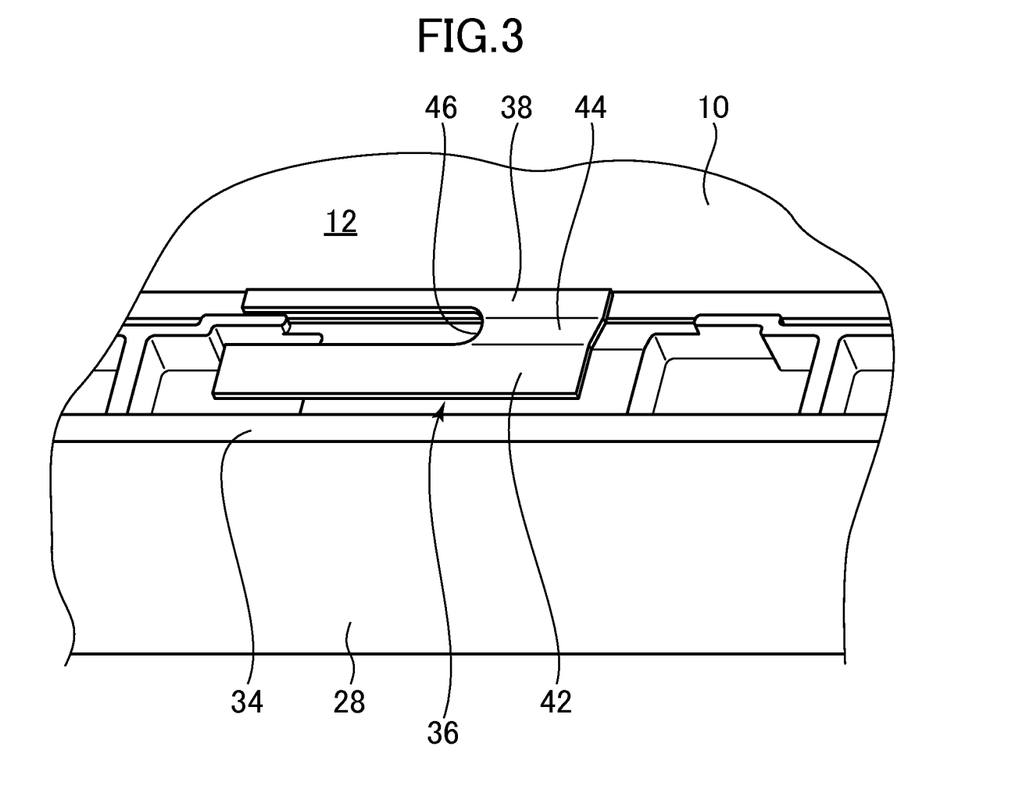
FIG. 3 is a perspective view showing the liquid crystal display device shown in FIG. 1 in a state where a metal frame is removed.

FIG. 3 is a perspective view showing the liquid crystal display device shown in FIG. 1 in a state where the metal frame 22 is removed from the liquid crystal display device. The liquid crystal display device includes a resin frame 28. The resin frame 28 includes a support portion 30 for supporting the liquid crystal display panel 10 at a peripheral portion of the back surface 14 (FIG. 2). An elastic body 32 made of rubber, a resin or the like is interposed between the liquid crystal display panel 10 (to be more specific, the polarizer 20) and the support portion 30 thus absorbing an impact. The resin frame 28 includes a resin frame portion 34 which surrounds the liquid crystal display panel 10. At least a portion of an upper surface of the resin frame portion 34 is arranged at a higher position than the image display screen 12, and the portion is formed parallel to the image display screen 12. The metal frame portion 24 is arranged in a state where the metal frame portion 24 opposedly faces an outer side of the resin frame portion 34. In this embodiment, "height" means a direction that the image display screen 12 faces. The height is increased along with the increase of a distance from the image display screen 12.

The liquid crystal display device includes a conductive elastic sheet 36 made of conductive rubber or the like. The conductive elastic sheet 36 includes an inner portion 38 which is laminated to the image display screen 12 of the liquid crystal display panel 10. To be more specific, a transparent conductive film 40 is arranged on the image display screen 12, and the inner portion 38 is laminated to the transparent conductive film 40. Due to such lamination, the inner portion 38 is electrically connected to the image display screen 12 (transparent conductive film 40). Accordingly, an electric charge accumulated in the upper substrate 16 can be released from the inner portion 38.

The inner portion 38 is laminated to the substrate 16 while avoiding the polarizer 20. The inner portion 38 of the conductive elastic sheet 36 is laminated to a center portion (a portion in the vicinity of a cross-sectional line II-II in FIG. 1) of a side (for example, a long side) of the rectangular image display screen 12. When the liquid crystal display panel 10 warps, a warping amount of the center portion is small compared to a warping amount of a rectangular corner portion and hence, the center portion is selected. The inner portion 38 of the conductive elastic sheet 36 is laminated to the image display screen 12 of the liquid crystal display panel 10 in a flat shape and hence, a stress is not present in the inner portion 38. Accordingly, the inner portion 38 hardly peels off from the image display screen 12.

As shown in FIG. 2, the conductive elastic sheet 36 includes an outer portion 42 which is sandwiched between the resin frame portion 34 and the metal frame portion 24 and is brought into contact with the metal frame portion 24. The outer portion 42 is electrically connected to the metal frame portion 24 by this contact. Due to such a constitution, the upper substrate 16 of the liquid crystal display panel 10 and the metal frame 22 can be electrically connected to each other by the conductive elastic sheet 36 and hence, even when the upper substrate 16 is charged with electricity, the charged electricity can be released to the metal frame 22. The metal frame 22 may be connected to a casing not shown in the drawing. The outer portion 42 and the metal frame portion 24 are merely brought into contact with each other and are not adhered to each other. The outer portion 42 of the conductive elastic sheet 36 is elastically deformed by being compressed between the resin frame portion 34 and the metal frame portion 24. Due to such a constitution, the conductive elastic sheet 36 is brought into pressure contact with the metal frame portion 24 and hence, the electrical connection between both the conductive elastic sheet 36 and the metal frame portion 24 can be secured.

At least a portion (for example, the whole portion) of the outer portion 42 of the conductive elastic sheet 36 is arranged at a higher position than the inner portion 38. The outer portion 42 of the conductive elastic sheet 36 is arranged in a flat shape. This shape conforms to a shape of an upper surface of the resin frame portion 34. The upper surface of the resin frame 34 has an opposely facing region which opposely faces the outer portion 42 of the conductive elastic sheet 36. The opposely facing region is formed at a higher position than the image display screen 12 and parallel to the image display screen 12.

The conductive elastic sheet 36 includes a connecting portion 44 which connects the outer portion 42 and the inner portion 38. As shown in FIG. 3, the conductive elastic sheet 36 has a slit 46 formed between the outer portion 42 and the inner portion 38 and adjacent to the connecting portion 44. Due to the formation of the slit 46, the conductive elastic sheet 36 has a horizontally U-shaped planar shape. As a modification of the conductive elastic sheet 36, the conductive elastic sheet 36 may have an N-shaped, H-shaped or Z-shaped planar shape.

At least one of the outer portion 42 and the connecting portion 44 of the conductive elastic sheet 36 (in this embodiment, only the connecting portion 44) is bent in a height increasing direction from the same height position as the inner portion 38. The connecting portion 44 is bent in the height increasing direction at the same height position as the inner portion 38.

According to this embodiment, the conductive elastic sheet 36 has the slit 46 formed between the outer portion 42 and the inner portion 38 and hence, even when at least one of the outer portion 42 and the connecting portion 44 is bent, an action imparted to the inner portion 38 by an elastic force of the conductive elastic sheet 36 is small. Accordingly, the inner portion 38 hardly peels off from the image display screen 12 and hence, it is possible to secure the electrical connection between the conductive elastic sheet 36 which is electrically connected to the metal frame 22 and the image display screen 12.

Figure 4:
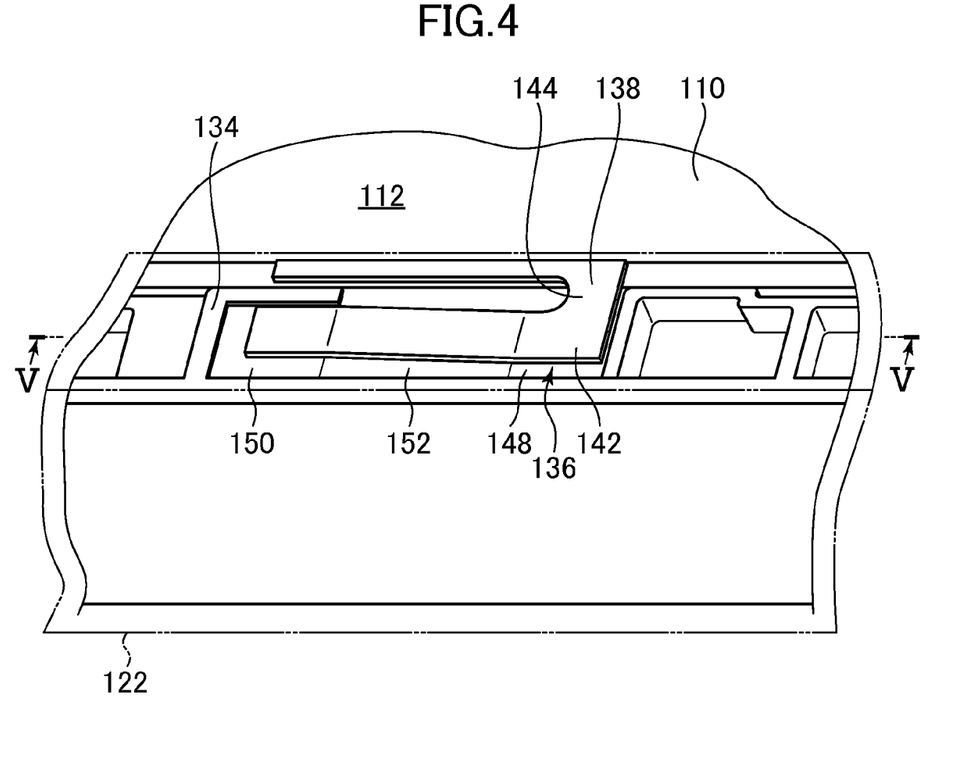
FIG. 4 is a perspective view of a liquid crystal display device according to another embodiment of the present invention.
Figure 5:
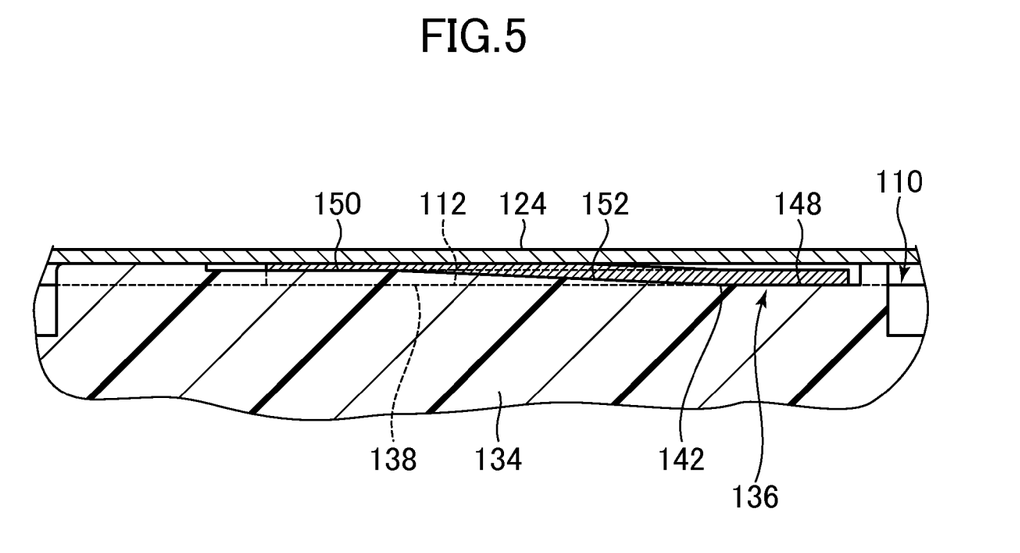
FIG. 5 is an enlarged view of the liquid crystal display device taken along a line V-V in FIG. 4.

FIG. 4 is a perspective view of a liquid crystal display device according to another embodiment of the present invention. FIG. 5 is an enlarged view of the liquid crystal display device taken along a line V-V in FIG. 4.

A conductive elastic sheet 136 includes an inner portion 138 which is laminated to an image display screen 112 of a liquid crystal display panel 110. The inner portion 138 of the conductive elastic sheet 136 is laminated to the image display screen 112 of the liquid crystal display panel 110 in a flat shape and hence, the inner portion 138 hardly peels off from the image display screen 112.

In this embodiment, an upper surface of a resin frame portion 134 has an opposedly facing region which opposedly faces an outer portion 142 of the conductive elastic sheet 136. The opposedly facing region has a first parallel region 148 which is formed at the same height as the image display screen 112 and parallel to the image display screen 112. The outer portion 142 of the conductive elastic sheet 136 is arranged in a flat shape on the first parallel region 148. The opposedly facing region has a second parallel region 150 which is formed at a higher position than the image display screen 112 and parallel to the image display screen 112. The outer portion 142 of the conductive elastic sheet 136 is arranged in a flat shape on the second parallel region 150.

The opposedly facing region has an inclined region 152 which is inclined such that a height of the inclined region 152 is increased from the first parallel region 148 (decreased from the second parallel region 150). The outer portion 142 is arranged in an inclined manner on the inclined region 152. The outer portion 142 is bent between the first parallel region 148 and the inclined region 152 and between the second parallel region 150 and the inclined region 152.

A connecting portion 144 is arranged in a flat shape at the same height position as the inner portion 138. The connecting portion 144 is connected to a portion of the outer portion 142 on the first parallel region 148. Accordingly, the connecting portion 144 is connected to the inner portion 138 in a flat shape and hence, a stress is not present in the connecting portion 144. In this manner, the connecting portion 144 having no stress therein is connected to the inner portion 138 having no stress therein and hence, a force which acts so as to peel off the inner portion 138 is not applied to the inner portion 138. Due to such a constitution, it is possible to secure the electrical connection between the conductive elastic sheet 136 which is electrically connected to the metal frame portion 124 and the image display screen 112. With respect to other details relating to the structure, and the manner of operation and advantageous effects of this embodiment, the contents explained in conjunction with the previously mentioned embodiment are applicable to this embodiment.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
    a liquid crystal display panel which has an image display screen and a back surface on a side opposite to the image display screen;
    a resin frame which includes a support portion for supporting the liquid crystal display panel at a peripheral portion of the back surface, and a resin frame portion which surrounds the liquid crystal display panel;
    a metal frame which includes a metal frame portion facing a peripheral portion of the image display screen of the liquid crystal display panel and the resin frame portion; and
    a conductive elastic sheet which includes: an outer portion which is sandwiched between the resin frame portion and the metal frame portion and is brought into contact with the metal frame portion; an inner portion which is laminated to the image display screen of the liquid crystal display panel; and a connecting portion which connects the outer portion and the inner portion; wherein at least a portion of an upper surface of the resin frame portion is arranged at a higher position than the image display screen,
    at least a portion of the outer portion of the conductive elastic sheet is arranged at a higher position than the inner portion,
    the inner portion of the conductive elastic sheet is laminated to the image display screen of the liquid crystal display panel in a flat shape,
    the conductive elastic sheet has a slit formed between the outer portion and the inner portion and adjacent to the connecting portion, and
    at least one of the outer portion and the connecting portion of the conductive elastic sheet is bent in a height increasing direction from the same height position as the inner portion.

2. The liquid crystal display device according to claim 1, wherein the upper surface of the resin frame portion has an opposedly facing region which opposedly faces the outer portion of the conductive elastic sheet,
    the opposedly facing region is formed at a higher position than the image display screen and parallel to the image display screen,
    the outer portion of the conductive elastic sheet is arranged in a flat shape, and the connecting portion is bent in the height increasing direction from the same height position as the inner portion.

3. The liquid crystal display device according to claim 1, wherein the upper surface of the resin frame portion has an opposedly facing region which opposedly faces the outer portion of the conductive elastic sheet, the opposedly facing region has a parallel region which is formed at the same height as the image display screen and parallel to the image display screen, and an inclined region which is inclined such that a height of the inclined region is increased from the parallel region, the outer portion of the conductive elastic sheet is arranged in a flat shape on the parallel region, is arranged in an inclined manner on the inclined region, and is bent between the parallel region and the inclined region, and the connecting portion is arranged in a flat shape at the same height position as the inner portion, and is connected to a portion of the outer portion on the parallel region.

4. The liquid crystal display device according to claim 1, wherein the image display screen has a rectangular planar shape, and the inner portion of the conductive elastic sheet is laminated to a center portion of a side of the rectangular image display screen.

5. The liquid crystal display device according to claim 1, wherein the outer portion of the conductive elastic sheet is elastically deformed by being compressed between the resin frame portion and the metal frame portion.

6. The liquid crystal display device according to claim 1, wherein the metal frame portion is arranged above the image display screen with a gap formed therebetween.

* * * * *